United States Patent
Jones et al.

(10) Patent No.: US 7,646,705 B2
(45) Date of Patent: Jan. 12, 2010

(54) MINIMIZING DATA LOSS CHANCES DURING CONTROLLER SWITCHING

(75) Inventors: Wendell D. Jones, Cary, NC (US); Greg Kaszycki, Cary, NC (US); David L. Kaminsky, Chapel Hill, NC (US); John Michael Lake, Cary, NC (US); David M. Ogle, Cary, NC (US); Jonathan G. Rossie, Cary, NC (US); Jonathan Sobel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1369 days.

(21) Appl. No.: 10/411,828

(22) Filed: Apr. 11, 2003

(65) Prior Publication Data

US 2004/0202105 A1    Oct. 14, 2004

(51) Int. Cl.
*H04J 1/16* (2006.01)
(52) U.S. Cl. .................. 370/217; 370/244; 370/400
(58) Field of Classification Search ............. 370/228, 370/217, 227, 400, 329; 379/92.01, 92.02; 714/43, 7, 4, 9, 3, 717; 709/221
See application file for complete search history.

(56) References Cited

U.S. PATENT DOCUMENTS 5,202,822 A    4/1993    McLaughlin et al. ........ 364/187

(Continued)

OTHER PUBLICATIONS

Du, Quorumcast Routing by Multispace Search page 1069; IEEE 1996.*

(Continued)

*Primary Examiner*—Seema S. Rao
*Assistant Examiner*—Henry Baron
(74) *Attorney, Agent, or Firm*—Ido Tuchman; Feb R. Cabrasawan

(57) ABSTRACT

A method, system, and computer program for managing network connectivity between a plurality of nodes and a network resource. The network resource includes a primary path to the nodes and at least one redundant path. A detecting module is configured to determine if the primary path is unavailable to at least one affected node belonging to the plurality of nodes. A switching module is configured to presumptively switch the affected node to the redundant path if the primary path is unavailable. An initiating module configured to initiate a voting procedure among the plurality of nodes to select a new path to the network resource, wherein data flow at the affected node through the redundant path continues during the voting procedure.

4 Claims, 3 Drawing Sheets

U.S. PATENT DOCUMENTS

| | | | |
|---|---|---|---|
| 5,289,589 A | 2/1994 | Bingham et al. | 395/425 |
| 5,544,347 A | 8/1996 | Yanai et al. | 396/489 |
| 5,548,712 A | 8/1996 | Larson et al. | 395/182.05 |
| 5,712,970 A | 1/1998 | Arnott et al. | 395/182.04 |
| 5,729,685 A | 3/1998 | Chatwani et al. | 395/200.11 |
| 5,734,818 A | 3/1998 | Kern et al. | 395/182.18 |
| 5,742,792 A | 4/1998 | Yanai et al. | 395/489 |
| 5,805,920 A | 9/1998 | Sprenkle et al. | 395/821 |
| 5,838,894 A | 11/1998 | Horst | 396/182.09 |
| 5,889,935 A | 3/1999 | Ofek et al. | 395/182.04 |
| 5,975,738 A | 11/1999 | DeKoning et al. | 364/184 |
| 6,073,218 A | 6/2000 | DeKoning et al. | 711/150 |
| 6,128,750 A * | 10/2000 | Espy et al. | 714/7 |
| 6,138,049 A | 10/2000 | McLaughlin | 700/67 |
| 6,230,200 B1 | 5/2001 | Forecast et al. | 709/226 |
| 6,243,676 B1 | 6/2001 | Witteman | 704/243 |
| 6,304,942 B1 | 10/2001 | DeKoning | 711/114 |
| 6,377,374 B1 | 4/2002 | Davis et al. | 359/128 |
| 7,016,946 B2 * | 3/2006 | Shirriff | 709/221 |

OTHER PUBLICATIONS

R.E. Linday and R. W. Ryniker, Concurrent Operation of Two Channel Adapters, IBM Technical Disclosure Bulletin, vol. 17, No. 8, pp. 2479-2483, Jan. 1975.

http://www.veritas.com/products/category/... TQFIYBSSFEY?productkeywordid=140&productid=foundation, p. 1 of 1, Jul. 11, 2002.

* cited by examiner

MINIMIZING DATA LOSS CHANCES DURING CONTROLLER SWITCHING

FIELD OF THE INVENTION

The present invention relates generally to computer networks, and more specifically to management of network connectivity between a group of nodes and a network resource.

BACKGROUND

In many computer network configurations, a network resource can be accessed and shared by several computers. As used herein, the term "network resource" is any device or application used by computers (also referred to as "nodes") in the network. A network resource may, for example, be a printer or mass storage device. Often times, the network resource includes at least one controller to manage input and/or output operations at the network resource. The controller may, for example, coordinate data transfers and provide data caching for the network resource.

Because of the controller's critical importance in the operation of network resources, it is common to find at least one backup controller in addition to an active controller within fault-tolerant network resources. For instance, many Redundant Array of Inexpensive Disks (RAID) systems include one active controller and one backup controller.

Although there may be more than one controller present at a network resource, a key principle for ensuring efficient operation of the network resource is that there be only one controller actively used by a node group. When two or more controllers are active at the same time, problems such as disk thrashing or delayed data transmission may occur. To avoid these and other problems, a node group will often coordinate communications with a network resource such that all the node group members utilize the same active controller.

It is possible that one or more nodes in a node group may lose access to the active controller of a network resource due to cabling or other issues. In conventional systems, the node that notices the outage must typically stop all data transfer to and from the network resource, inform the node group of the outage, and wait until the node group selects a new active controller. Such conventional solutions emphasize performance over availability, as they avoid the performance penalty associated with flushing the cache on the active controller. Nevertheless, queuing data until all nodes in the group choose a backup controller requires large memory reserves at each node and can lead to data loss. Furthermore, if consensus cannot be reached on a new controller, the system is forced to fail the input/output operations.

SUMMARY OF THE INVENTION

The present invention addresses the above-mentioned limitations of traditional node group models by switching nodes with an outage to a backup controller or, more generally, a redundant network path before node group consensus is reached. Although the present invention incurs a short-term performance penalty while, for example, thrashing occurs, it reduces the need for nodes to queue data while a new network path is selected by the node group. Thus, the present invention beneficially helps eliminate the possibility that nodes will lose data. The present invention exploits failover logic already present in controllers, accepts the performance penalty, and works to minimize its impact through timely post facto negotiation. If a node cannot switch to the new network path, then a best-fit algorithm is used to determine which network path should be used. All nodes that cannot use the chosen path are forced to leave the node group.

Thus, an aspect of the present invention involves a method for managing network connectivity between a plurality of nodes and a network resource. The network resource includes a primary path to the nodes and at least one redundant path. The method comprises a detecting operation to detect whether the primary path is unavailable to at least one affected node belonging to the plurality of nodes. A switching operation presumptively switches the affected node to the redundant path if the primary path is determined to be unavailable. An initiating operation is used to initiate a voting procedure among the plurality of nodes to select a new path to the network resource. Data flow between the affected node and the network resource through the redundant path continues during the voting procedure.

Another aspect of the invention is a system for managing network connectivity between a plurality of nodes and a network resource. The system includes a detecting module configured to determine if the primary path is unavailable to at least one affected node belonging to the plurality of nodes. A switching module is configured to presumptively switch the affected node to the redundant path if the primary path is unavailable. An initiating module configured to initiate a voting procedure among the plurality of nodes to select a new path to the network resource, wherein data flow at the affected node through the redundant path continues during the voting procedure.

A further aspect of the invention is a computer program product embodied in a tangible media for managing network connectivity between a plurality of nodes and a network resource. The program includes program codes configured to detect if the primary path is unavailable to at least one affected node belonging to the plurality of nodes, presumptively switch the affected node to the redundant path if the primary path is unavailable, and initiate a voting procedure among the plurality of nodes to select a new path to the network resource. Data flow between the affected node and the network resource through the redundant path continues during the voting procedure.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
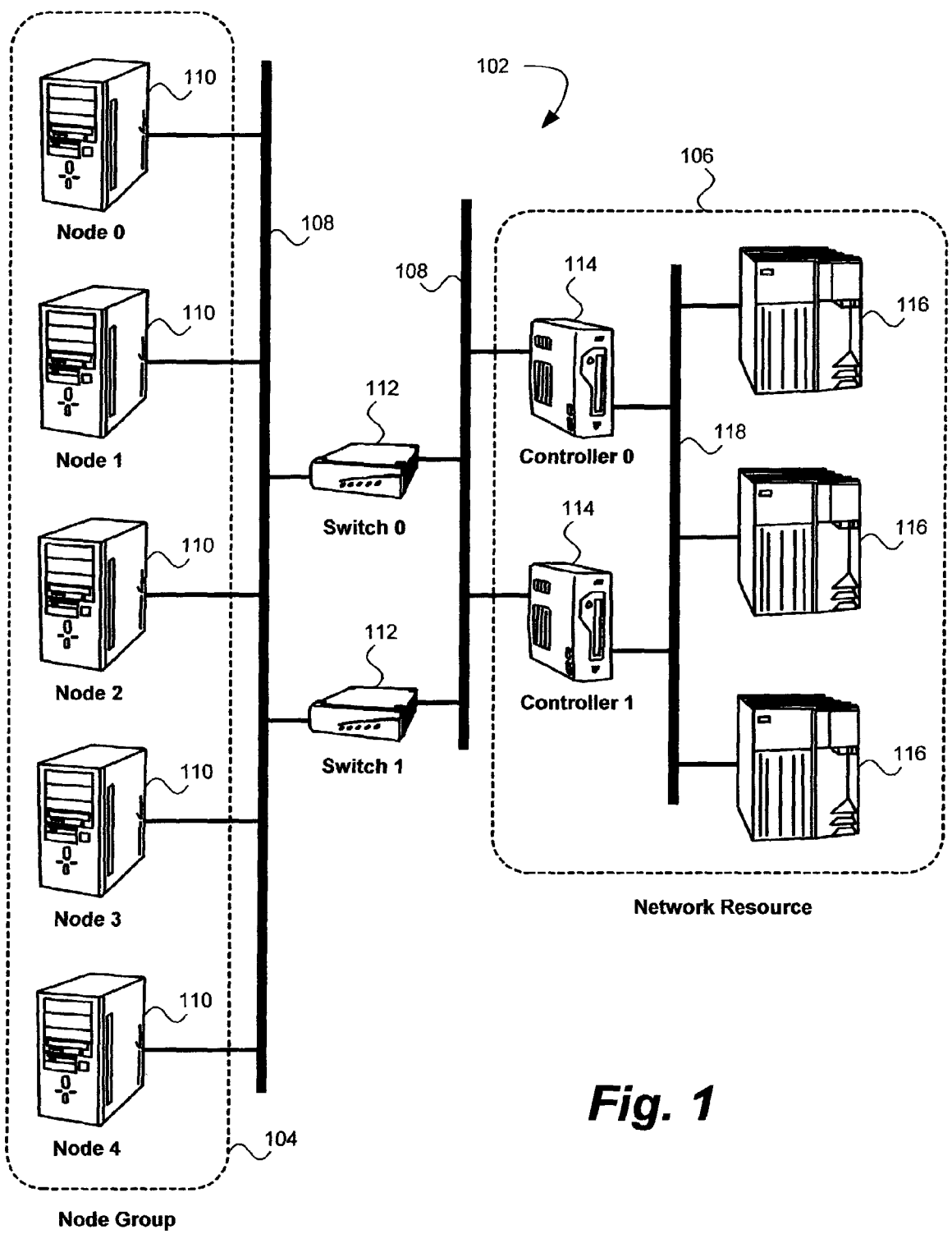
FIG. 1 shows an exemplary network environment embodying the present invention.

The following description details how the present invention is beneficially employed to improve network connectivity between a group of nodes and a network resource. Throughout the description of the invention reference is made to FIGS. 1-3. When referring to the figures, like structures and elements shown throughout are indicated with like reference numerals.

In FIG. 1, an exemplary network environment 102 embodying the present invention is shown. It is initially noted that the network environment 102 is presented for illustration purposes only, and is representative of countless configurations in which the invention may be implemented. Thus, the present invention should not be considered limited to the system configuration shown in the figure.

The network environment 102 includes a node group 104 coupled to a network resource 106 by means of a computer network 108. In one embodiment of the invention, the node group 104 is configured as a load balancing server cluster. The node group 104 generally comprises a plurality of nodes 110 sharing access to the network resource 106. As discussed below, the nodes 110 are capable of collectively selecting one path out of several possible network paths in the network 108 for accessing the network resource 106.

The computer network 108 may be any network known in the art for effectuating communications between the nodes 110 and the network resource 106. Thus, the computer network 108 can be a Local Area Network (LAN), a Wide Area Network (WAN), or a combination thereof. It is contemplated that the computer network 108 may be configured as a public network, such as the Internet, and/or a private network, such as an Intranet, and may include various topologies and protocols known to those skilled in the art. Furthermore, the computer network 108 may include various networking devices known to those skilled in the art, such as routers, switches 112, bridges, repeaters, etc.

The network resource 106 represents an item or items accessed by the node group 104. The network resource 106 may, for example, be a printer or mass storage device. Often times, the network resource 106 includes at least one controller 114 that manages input and/or output data flow at network resource 106. The controller 114, for example, may coordinate data operations and provide data caching for the network resource 106.

As noted, there may be more than one controller 114 present at the network resource 106. In such configurations, an active controller (i.e., Controller 0) is typically used to carry out input and/or output operations while the other controller(s) (i.e., Controller 1) is used as a backup controller in case the active controller fails. Thus, multiple controllers 114 add redundancy to the network resource 106 and help increase the reliability of the network environment 102.

In one embodiment of the invention, the network resource 106 is a collection of disk drives 116 arranged as a RAID system. Memory volumes in the RAID system are mapped as Logical Unit Numbers (LUNs), and the controllers 114 manage access to the RAID system by advertising LUNs to the node group 104. The RAID system may include a high-speed data interface 118, such as a Small Computer System Interface (SCSI) or Fibre Channel link.

Generally, each node 110 in the node group 104 is capable of accessing the network resource 106 through more than one data path in the network 108. For instance, each node 110 may use either Switch 0 or Switch 1 and either Controller 0 or Controller 1 to access the network resource 106. In other words, each node 110 has four possible routes to access the network resource 106:

| Switch | Controller |
|--------|------------|
| 0 | 0 |
| 0 | 1 |
| 1 | 0 |
| 1 | 1 |

Despite the fact that multiple network paths may exist for each node 110, it is generally advantageous for all the nodes 110 in the node group 104 to access the network resource 106 using the same network path. Using different network paths may cause inefficiencies within the network environment 102. For example, accessing the disk drives 116 through both Controller 0 and Controller 1 may cause undesirable disk thrashing or require data to be forwarded from the active controller to the backup controller and vice-versa. Thus, it is contemplated that nodes 110 in the node group 104 may employ various voting procedures known in the art to collectively select a common network path for accessing the network resource 106.

Once a common network path is established, however, connectivity problems may arise that can cause one or more of the nodes 110 in the node group 104 to be unable to use the selected common network path. Consider, for example, a scenario where all the nodes 110 in the node group 104 access the network resource 106 via Controller 0. At some point during operation, Node 3 loses connectivity to Controller 0 because of a broken network cable. Thus, Node 3 is unable to access the network resource 106 through the common network path. The present invention presents a mechanism for establishing a new common network path for the node group 104 in a manner that reduces the potential for data loss.

In brief, the affected node (Node 3 in the example above) detects that the node group's primary path to the network resource 106 is unavailable. The affected node then presumptively switches its network path a redundant path (i.e., Node 3 switches to Controller 1). Furthermore, a voting procedure among the nodes 110 is initiated to select a new path to the network resource 106, wherein data flow at the affected node through the redundant path continues during the voting procedure.

Unlike conventional techniques for handling a broken primary path to a network resource, present invention does not require the network environment 102 to suspend data exchange between the node group 104 and the network resource 106 while a new primary path for the node group 104 is chosen. Conventional techniques typically stop input/output transfers, renegotiate a new primary network path with the other nodes in the system, and then, after some delay, reissue the input/output requests if the negotiation is successful. Such solutions often emphasize performance over availability, as they avoid the performance penalty associated with flushing the cache on the primary controller. However, if consensus cannot be reached, the system is forced to fail the input/output operations.

The present invention advantageously allows a path switch to occur without requiring data queuing. The affected node changes its network path to the network resource without waiting for the other node group members to agree that the change can occur. Although the present invention may incur a short-term performance penalty while, for example, the disk drive thrashes, it reduces the need to queue data. Thus, the present invention greatly reduces the possibility that the affected node will lose data.

Figure 2:
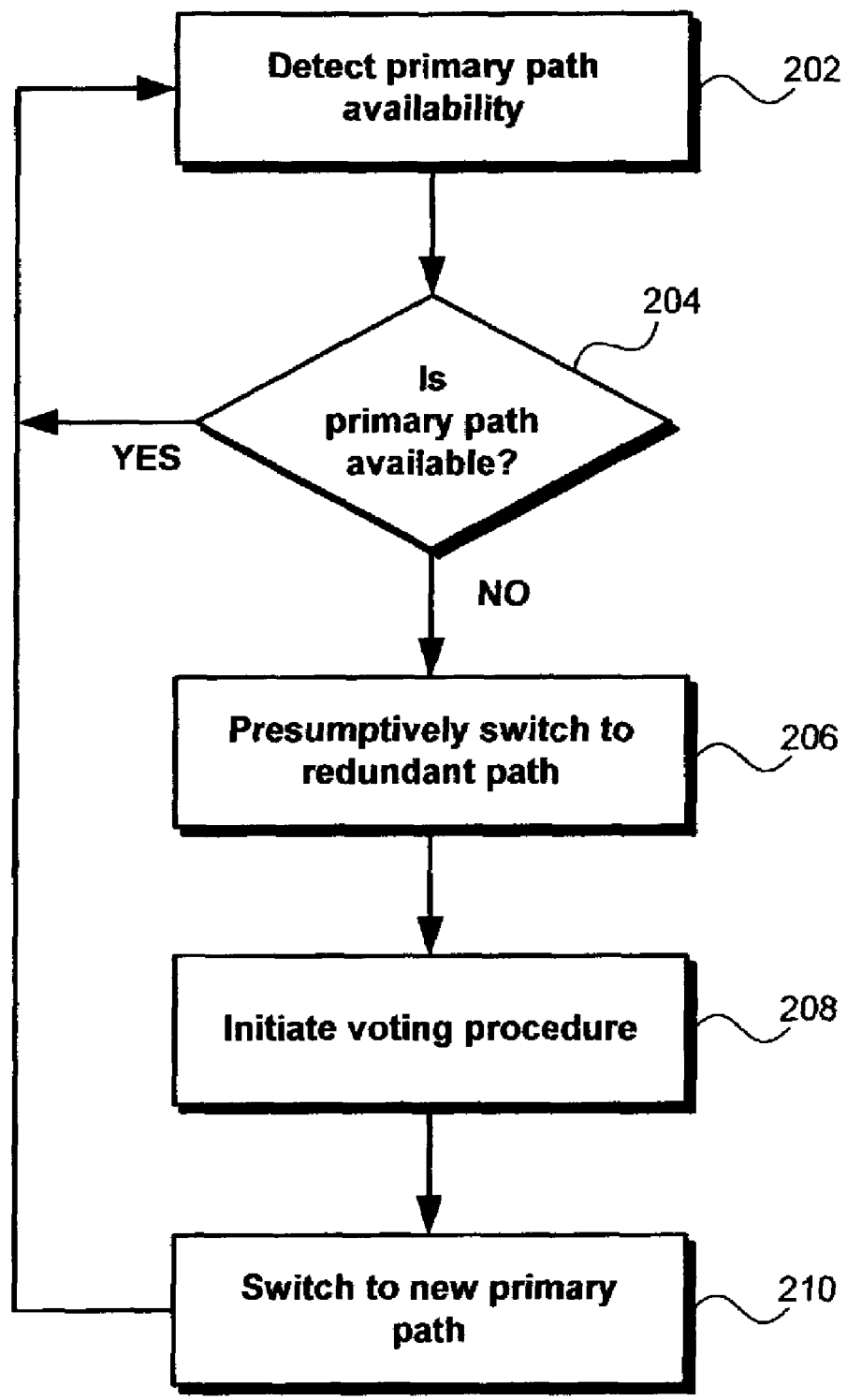
FIG. 2 shows an exemplary flowchart for managing network connectivity between a plurality of nodes and a network resource, as contemplated by one embodiment of the present invention.

In FIG. 2, an exemplary flowchart for managing network connectivity between a plurality of nodes and a network resource, as contemplated by one embodiment of the present invention, is shown. It should be remarked that the logical operations shown may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

At detecting operation 202, a node belonging to a node group detects if the node group's network path (also referred to herein as a primary path) is unavailable. There may be many reasons why the primary path is unavailable to the node, such as cabling issues, software crashes, etc. As mentioned above, detecting if the primary path is unavailable may include detecting if the node has access to a network resource's primary controller.

Detecting whether a primary path is available may involve sending a network message along the primary path and not receiving an expected response to the message within a predetermined waiting period. If no response is received, a timeout error is declared. In other network configurations, the node may be actively informed when the primary path is no longer available. In one embodiment of the invention, detecting operation 202 is performed several times before the primary path is declared unavailable. Checking the primary path more than once for availability helps reduce the number of false alarms due to brief outages in the network path. After detecting operation 202 is completed, control passes to query operation 204.

At query operation 204, the affected node decides if the primary path is unavailable. If the query results in a determination that the primary path is considered available, control returns to detecting operation 202. On the other hand, if query operation 204 determines that the primary path is indeed unavailable, control is passed to switching operation 206.

At switching operation 206, the affected node presumptively switches to a redundant path if the primary path is determined to be unavailable. The switching operation 206 may involves modifying network packets from the affected node such that a new path is traversed. Alternatively, the switching operation 206 may require modification of routing tables within the network environment. It is further contemplated that presumptively switching to the redundant path includes presumptively switching to a redundant controller at the network resource. Various other techniques known to those skilled in the art for switching network paths may be utilized by the present invention.

At initiating operation 208, a voting procedure is initiated among the plurality of nodes to select a new path to the network resource. During the initiating operation 208, data flow between the affected node and the network path through the redundant path continues. The affected node may initiate the voting procedure by contacting the node group members directly or by informing a node managing the node group that a voting procedure is necessary.

It is important to note that the switching operation 206 and the initiating operation 208 can occur at the same time. Thus, while the node group members are trying to reach a consensus as to which network route should become the new primary path for the node group, the affected node can still transfer data to and from the network resource along a redundant path. Moreover, other nodes in the node group can continue to transfer data to and from the network resource along the old primary path. Thus, the present invention advantageously eliminates the need to create large data queues while a new primary network path is negotiated between the node group members. As a result, the chances that data loss will occur are reduced.

At switching operation 210, the node group members switch to the new primary path decided on during the voting procedure. The new primary path may not necessarily be the redundant path selected by the affected node during switching operation 206. It is contemplated that if one or more nodes in the node group cannot switch to the new primary path (i.e., the node does not have a connection to the new primary path), a best-fit algorithm may be used to determine which network path should be used. Those nodes that cannot communicate via the chosen network path should then be forced to leave the node group.

Figure 3:
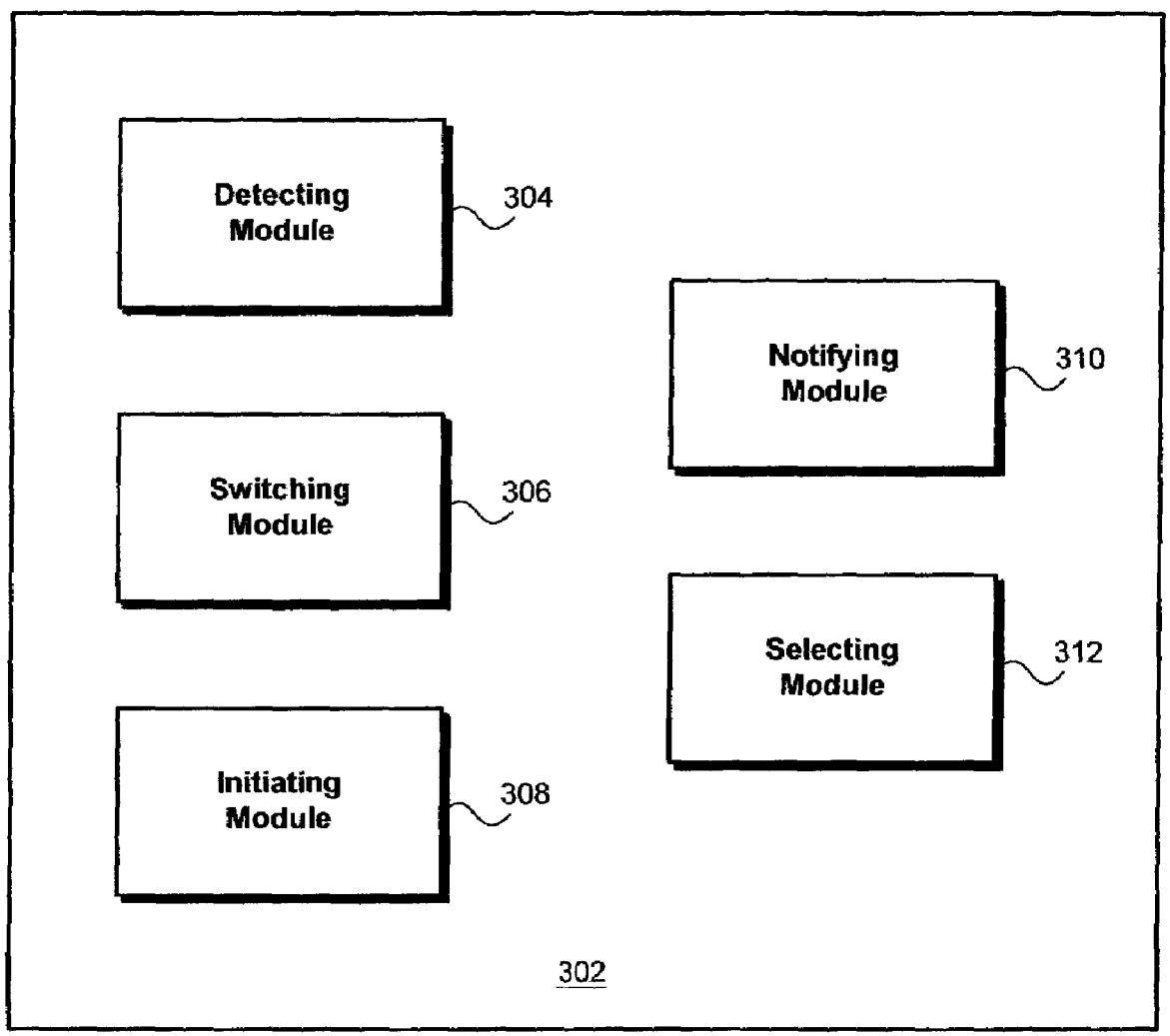
FIG. 3 shows an exemplary system implementing the present invention.

Turning now to FIG. 3, an exemplary system 302 implementing the present invention is shown. The system includes a detecting module 304 configured to determine if the primary path is unavailable to at least one affected node belonging to a plurality of nodes. In one embodiment of the invention, the detecting module 304 is further configured to detect whether the affected node does not have access to a primary controller coupled to a network resource.

A switching module 306 is configured to presumptively switch the affected node to the redundant path if the primary path is unavailable. The switching module 306 may be further configured to presumptively switch the affected node to a redundant controller if the affected node does not have access to the primary controller. An initiating module 308 is configured to initiate a voting procedure among the node group members to select a new path to the network resource, wherein data flow at the affected node through the redundant path continues during the voting procedure.

The system 302 may also include a notifying module 310 and a selecting module 312. The notifying module 310 is configured to notify the nodes that the affected node has switched to the redundant path. The selecting module 312 is configured to select the new path based on a best-fit algorithm.

The foregoing description of the invention has been presented for purposes of illustration and description. It is not intended to be exhaustive or to limit the invention to the precise form disclosed, and other modifications and variations may be possible in light of the above teachings. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for managing network connectivity between a plurality of nodes and a network resource, the network resource including a primary controller path to the nodes and at least one redundant controller path, the method comprising:

detecting if the primary controller path is unavailable to at least one affected node belonging to the plurality of nodes;

presumptively switching the affected node to the redundant controller path if the primary controller path is determined to be unavailable;

notifying the non-affected nodes that the affected node has switched to the redundant controller path;

and initiating a voting procedure among the plurality of nodes to select a new common controller path between a plurality of nodes and the network resource, wherein data flow between the affected node and the network resource through the redundant controller path continues during the voting procedure.

2. The method of claim 1, wherein detecting if the primary controller path is unavailable includes detecting that the affected node does not have access to a primary controller, wherein the primary controller is coupled to the network resource.

3. The method of claim 2, wherein presumptively switching the affected node to the redundant controller path includes presumptively switching the affected node to a redundant controller.

4. A method for managing network connectivity between a plurality of nodes and a network resource, the network resource including a primary controller path to the nodes and at least one redundant controller path, the method comprising:

detecting if the primary controller path is unavailable to at least one affected node belonging to the plurality of nodes;

presumptively switching the affected node to the redundant controller path if the primary path is determined to be unavailable;

initiating a voting procedure among the plurality of nodes to select a new common controller path to the network resource, wherein data flow between the affected node and the network resource through the redundant controller path continues during the voting procedure; and selecting the new controller path based on a best-fit algorithm.

\* \* \* \* \*

UNITED STATES PATENT AND TRADEMARK OFFICE
CERTIFICATE OF CORRECTION

PATENT NO.         : 7,646,705 B2
APPLICATION NO.    : 10/411828
DATED              : January 12, 2010
INVENTOR(S)        : Jones et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2038 days.

Signed and Sealed this

Sixteenth Day of November, 2010

David J. Kappos
*Director of the United States Patent and Trademark Office*